US006235840B1

(12) United States Patent
Thiruvengada et al.

(10) Patent No.: US 6,235,840 B1
(45) Date of Patent: May 22, 2001

(54) NYLON MODIFIERS HAVING ENHANCED FLOW PROPERTIES

(75) Inventors: Seshan Thiruvengada, Seymour, CT (US); Robert C. Constable, Stroudsburg, PA (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/532,958

(22) Filed: Mar. 22, 2000

Related U.S. Application Data

(62) Division of application No. 09/038,406, filed on Mar. 11, 1998, now Pat. No. 6,077,906.

(51) Int. Cl.⁷ .............................. C08G 63/91; C08L 51/04
(52) U.S. Cl. ................................. 525/71; 525/69; 525/74; 525/207; 525/179
(58) Field of Search ..................... 525/71, 74, 207

(56) References Cited

U.S. PATENT DOCUMENTS

| | | | |
|---|---|---|---|
| 3,388,186 | 6/1968 | Kray et al. | 260/857 |
| 3,465,059 | 9/1969 | Seven et al. | 260/857 |
| 3,668,274 | 6/1972 | Owens et al. | 260/857 |
| 3,845,163 | 10/1974 | Murch | 260/857 |
| 4,174,358 | 11/1979 | Epstein | 525/183 |
| 4,427,828 | 1/1984 | Hergenrother et al. | 525/66 |
| 4,647,509 | 3/1987 | Wallace et al. | 428/474.9 |
| 4,657,970 | 4/1987 | Shiraki et al. | 525/57 |
| 4,795,782 | 1/1989 | Lutz et al. | 525/66 |
| 5,278,231 | 1/1994 | Chundury | 525/66 |
| 5,317,059 | 5/1994 | Chundury et al. | 550/733 |

FOREIGN PATENT DOCUMENTS

| | | |
|---|---|---|
| 998439 | 7/1965 | (GB) . |
| 83/00492 | 2/1983 | (WO) . |

OTHER PUBLICATIONS

Chen et al., An Investigation of Instability of Phase Morphology of Blends of Nylons With Polyethylenes and Polystyrenes and Effects of Compatibilizing Agents, Polymer Engineering and Science, Jan. 1988, 28:2, pp. 69–80.
Ide et al., Studies on Polymer Blend of Nylon 6 and Polypropylene or Nylon 6 and Polystyrene Using the Reaction of Polymer, J. App. Polymer Sci., 18: 963–974 (1974).
Lindsey et al., Mechanical Properties of HDPE–PS–SEGS Blends, J. App. Polymer Sci., 26: 1–8 (1981).
Park et al., Morphological, Thermal and Rheological Properties of the Blends Polypropylene/Nylon–6, Polypropylene/Nylon–6/ (Maleic Anhydride–g–Polypropylene) and (Maleic Anhydride–g–Poly.propylene)/Nylon–6, Eur. Polym. J., 26:2, pp. 131–136 (1990).

*Primary Examiner*—Ana Woodward
(74) *Attorney, Agent, or Firm*—Daniel Reitenbach

(57) ABSTRACT

An impact modifier for thermoplastic polyamides comprises:
(A) an elastomeric olefin copolymer; and
(B) a resinous olefin homopolymer or copolymer
wherein at least one of (A) and (B) is maleated; and
wherein the melt flow index of the resulting composition measured at 230° C. and 2.16 kg weight is at least 3 g per 10 minutes.

2 Claims, No Drawings

NYLON MODIFIERS HAVING ENHANCED FLOW PROPERTIES

This application is a divisional of U.S. application Ser. No. 09/038,406, filed on Mar. 11, 1998 now U.S. Pat. No. 6,077,906.

BACKGROUND OF THE INVENTION

1. Field of the Invention

The present invention relates to modifiers for use in thermoplastic polyamide compositions that have improved ductility and toughness and to processes for preparing such compositions; specifically, the modifiers of the present invention have better flow and easier dispersibility than previously known materials during compounding with polyamides.

2. Description of Related Art

Thermoplastic polyamides are a class of materials that possess a good balance of properties, e.g., excellent mechanical characteristics, high heat resistance, and good durability, that make them useful as structural materials. On the other hand, they are known to be deficient in impact resistance, notch sensitivity, and moisture resistance. One route to improving impact resistance is by blending the polyamide with another polymer. Unfortunately, it has often been found that such blends provide their own set of problems, e.g., immiscibility between the polyamide and the modifying polymer, which can bring about poor adhesion between the two, leading to weak areas at their interface that result in mechanical failure.

It is difficult to obtain a good dispersion of a combination of a polar polymer, such as a polyamide, with a non-polar polymer, such as a polyolefin. It is known that the addition of a graft or block copolymer of similar chemical structure to the blend components can improve the quality of the dispersion. These copolymers, generally referred to as compatibilizers, are often added as a third component to the blend. Maleic anhydride grafted polypropylene has been suggested as a compatibilizer for polypropylene/nylon blends by Ide et al., *J. Appl. Polym. Sci.*, 18:963 (1974). The compatibilization of polyethylene/polyamide blends with maleic anhydride grafted polypropylene has been reported by Chen et al., *Polym. Engng. Sci.*, 28:69 (1988). These and similar blends have been studied and the results reported by Park et al., *Eur. Polym. J.* 26(2):131–136 (1990).

A compatibilizing agent is a material that, on a molecular scale, has particular regions that are compatible with each of the incompatible constituent polymers. Such compatibilizing agents typically surround one polymeric phase providing a chemical and/or physical bridge to the other polymeric phase. Insofar as portions of the compatibilizing agent are compatible with each of the constituent polymers, the bonding between the two incompatible polymeric phases is effectively enhanced through this intermediate compatibilizing phase. Such a system of incompatible polymers coupled by a compatibilizing agent results in a material that advantageously combines the more desirable properties of the constituent polymers.

A method of reclaiming mixed immiscible polymers by employing a compatibilizing agent has been described by Lindsey et al. *J. Appl. Polymer Sci.* 26:1–8 (1981). The system studied was a high density polyethylene (HDPE) and is polystyrene (PS) and a styrene-ethylene-butene-1-styrene (SEBS) copolymer (a linear triblock copolymer) as the compatibilizing agent. These ternary blends exhibited a considerable improvement in the balance of mechanical properties over a binary blend of high density polyethylene and polystyrene.

U.K. Patent Number 998,439 discloses a thermoplastic composition comprising a mixture of 50 to 99 percent linear polyamide and 1 to 50 percent of olefin copolymer particles, the olefin copolymer containing from 0.1 to 10 mole percent of acid groups.

U.S. Pat. No. 3,668,274 teaches improved impact strength of polycarbonamides modified with (A) a first elastomer phase of copolymers or terpolymers and (B) a final rigid phase thermoplastic stage containing amine-reactive moieties, preferably carboxylic acid groups.

U.S. Pat. No. 3,845,163 discloses blends of 60 to 85 percent by weight polyamide and an acid-containing olefin polymer in which the acid is derived from an $\alpha,\beta$-ethylenically unsaturated carboxylic acid and in which at least 10 percent of the acid groups has been neutralized with metal ions.

U.S. Pat. Nos. 3,388,186 and 3,465,059 disclose polyamide compositions that possess high impact strength with some values in excess of 10 foot pounds per inch. The disclosed compositions are graft copolymers prepared from an ethylene containing polymer.

U.S. Pat. No. 4,174,358 discloses toughened multiphase thermoplastic compositions consisting essentially of one phase containing 60 to 99 percent by weight of a polyamide matrix resin of number average molecular weight of at least 5,000 and 1 to 40 percent by weight of at least one other phase containing particles of at least one polymer that is adhered to the polyamide and has a particle size in the range of 0.01 to 3.0 microns and a tensile modulus in the range of 1.0 to 20,000 psi, wherein the ratio of the tensile modulus of the polyamide matrix to the tensile modulus of polymer is greater than 10 to 1.

U.S. Pat. No. 4,427,828 and WO83/00492 disclose blends of thermoplastic polyamide with a modified block copolymer to increase the impact strength of the polyamide.

U.S. Pat. No. 4,647,509 discloses a multilayer thermoformable packaging material comprising a first layer of (a) a vinylidene chloride polymer, (b) an incompatible polymer, e.g., polyesters and nylons, and (c) a compatibilizing agent, and a second layer of (a) a blend of an olefin polymer, a styrenic polymer, and a compatibilizing polymer, and (b) scrap material produced from the first and second layers. The compatibilizing polymers for the second layer are preferably block copolymers of olefins and styrene, such as copolymers of styrene-butadiene, styrene-butadiene-styrene, styrene-isoprene, etc.

U.S. Pat. No. 4,657,970 describes polymer compositions comprising at least one thermoplastic polymer including polyamides, thermoplastic polyesters, thermoplastic polyurethanes, vinyl alcohol polymers, etc., and at least one modified block copolymer of a monovinyl-substituted aromatic hydrocarbon polymer block A and at least one olefin compound polymer block B, to which has been grafted at least one molecular unit containing at least one member selected from a carboxylic acid group and groups derived therefrom. The modified copolymers and compositions are said to have excellent impact resistance, adhesion, paint adhesion, weatherability, resistance to aging, transparency, etc.

U.S. Pat. No. 4,795,782 describes a polymer blend—said to exhibit improved impact resistance—comprising a polyamide, a functionalized polyolefin, and a functionalized elastomer. The functionalized polyolefins are obtained by reacting a polyolefin with an unsaturated mono- or polycarboxylic acid or derivative thereof. Suitable unsaturated mono- or polycarboxylic acids include maleic anhydride, maleic acid, fumaric acid, etc. The functionalized elastomers described are generally functionalized selectively hydrogenated block copolymers of conjugated dienes and vinyl aromatic compounds. The block copolymers are functionalized by grafting the copolymers with a mono- or polycarboxylic acid compound, such as maleic anhydride, maleic acid, fumaric acid, etc. Other monomers that are utilized for introducing the functionality include vinyl monomers, such as acrylamide, acrylonitrile, monovinyl aromatic compounds (e.g., styrene), vinyl esters, vinyl ethers, etc.

U.S. Pat. No. 5,278,231 describes blended polymer compositions said to have improved impact resistance comprising:
- (I) from about 1 percent to about 97 percent by weight of at least one alpha-olefin polymer;
- (II) from about 1 percent to about 97 percent by weight of at least one polyamide;
- (III) from about 1 percent to about 97 percent by weight of at least one polymer of a vinyl aromatic hydrocarbon;
- (IV) an effective amount of a mixture of two or more compatibilizing agents selected from the group consisting of
  - (a) at least one selectively hydrogenated block copolymer of a vinyl aromatic hydrocarbon and a conjugated diene;
  - (b) at least one selectively hydrogenated block copolymer of a vinyl aromatic hydrocarbon and a conjugated diene to which has been grafted an alpha,beta-olefinically unsaturated monocarboxylic or dicarboxylic acid reagent; and
  - (c) at least one terpolymer of an alpha-olefin, at least one acrylic ester, and an alpha,beta-olefinically unsaturated dicarboxylic acid reagent, or a glycidyl acrylate.

U.S. Pat. No. 5,317,059 describes polymer compositions comprising:
- (I) from about 1 percent to about 98 percent by weight of at least one olefin polymer;
- (II) from about 1 percent to about 98 percent by weight of at least one polyamide;
- (III) an effective amount of a compatibilizing agent which comprises at least one terpolymer of an alpha-olefin, at least one acrylic ester, and an alpha, beta-olefinically unsaturated dicarboxylic acid reagent, or a glycidyl acrylate; and
- (IV) from 0 to about 25 percent by weight of at least one auxiliary compatibilizing agent being a member selected from the group consisting of:
  - (a) at least one selectively hydrogenated block copolymer of a vinyl aromatic hydrocarbon and a conjugated diene to which has been grafted an alpha,beta-olefinically unsaturated carboxylic acid reagent;
  - (b) at least one polymer which is the product of the reaction of an alpha-olefin polymer and an alpha, beta-olefinically unsaturated carboxylic acid reagent; and
  - (c) a mixture of (III) and (IVa) and/or (IVb) reacted in the presence of a radical initiator;

provided that when the blended polymer contains one or more of the auxiliary compatibilizing agents (IVa) or (IVb), the blended polymer is free of other polymers of vinyl aromatic hydrocarbons.

Thus, it is seen that the materials heretofore disclosed in the art for modification of polyamides and their blends are primarily maleated elastomers (e.g., EPDM) or maleated polyolefins that are used in improving the compatibility of blends of nylon with polyolefins.

The elastomeric materials, however, suffer from the inherent deficiency of insufficient flow during compounding with the polyamides. This deficiency results from the higher viscosity of the elastomer as compared to the polyamide phase at processing temperatures. The olefinic modifiers have sufficient flow but are not very efficient tougheners for nylon because of their lack of elastomeric character and lack of ductility to absorb impact forces, especially at low temperature.

SUMMARY OF THE INVENTION

The present invention relates to materials having enhanced flow, as compared to a pure maleated elastomer, obtained by blending EP or EPDM-type copolymers with high flow polyolefins, e.g., LLDPE and VLDPE, wherein at least one of the components is maleated. The enhanced flow is usually reflected in the high melt flow index characteristics of the composition. These materials also possess relatively better ductility as compared to pure maleated olefins.

The better flow characteristics are of interest in toughening very low-viscosity nylons that are not easily toughened by a pure maleated elastomer. The modifiers employed in the practice of the present invention can also be of use when the compounding of nylon is done using relatively low-shear equipment. Other added benefits of these modifiers relative to maleated EPDM elastomers include their non-blocking character and improved color in nylon. Non-blocking modifiers can facilitate handling during compounding operations, such as conveying and feeding. Color is of importance where natural (non-pigmented) color resins are required for end product use.

In particular, the present invention relates to an impact modifier for thermoplastic polyamides comprising:
- (A) an elastomeric olefin copolymer; and
- (B) a resinous olefin homopolymer or copolymer wherein at least one of (A) and (B) is maleated; and wherein the melt flow index of the resulting composition measured at 230° C. and 2.16 kg weight is at least 3 g per 10 minutes.

Preferably, the melt flow index of the resulting composition has a substantially higher melt flow index than does (A) alone, under conditions wherein the melt flow index of pure (A) is less than 0.1 g per 10 minutes at 230° C. and 2.16 kg weight and the melt flow index of pure (B) is at least 20 g per 10 minutes at 230° C. and 2.16 kg weight. More preferably, the melt flow index of the resulting composition is in the range of from about 5 to about 100 g per 10 minutes at 230° C. and 2.16 kg weight.

In another aspect, the present invention relates to a composition comprising a blend comprising a thermoplastic polyamide and an impact modifier comprising:
- (A) an elastomeric olefin copolymer; and
- (B) a resinous olefin homopolymer or copolymer wherein at least one of (A) and (B) is maleated; and wherein the melt flow index of the resulting composition measured at 230° C. and 2.16 kg weight is at least 3 g per 10 minutes.

In still another aspect, the present invention relates to a method for toughening a thermoplastic polyamide comprising blending with said polyamide an impact modifier comprising a blend comprising:
- (A) an elastomeric olefin copolymer; and
- (B) a resinous olefin homopolymer or copolymer wherein at least one of (A) and (B) is maleated; and wherein the melt flow index of the resulting composition measured at 230° C. and 2.16 kg weight is at least 3 g per 10 minutes.

DESCRIPTION OF THE PREFERRED EMBODIMENTS

As stated above, the present invention is directed to an impact modifier for thermoplastic polyamides comprising a blend comprising:

(A) an elastomeric olefin copolymer; and (B) a resinous olefin homopolymer or copolymer wherein at least one of (A) and (B) is maleated; and wherein the melt flow index of the resulting composition measured at 230° C. and 2.16 kg weight is at least 3 g per 10 minutes.

The polyamide matrix resins of the toughened compositions of the present invention are well known in the art and embrace those semi-crystalline and amorphous resins having molecular weights of at least 5,000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210.

Polyamide resins can be produced by the condensation of equimolar amounts of a saturated dicarboxylic acid containing from 4 to 12 carbon atoms with a diamine containing from 4 to 14 carbon atoms. If desired, excess diamine can be employed to provide an excess of amine end groups over carboxyl end groups in the polyamide.

Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamides produced by the ring opening of lactams, i.e., polycaprolactam, polylauric lactam, poly-11-amino-undecanoic acid, and bis(p-aminocyclohexyl) methane dodecanoamide. It is also possible to use in this invention polyamides prepared by the copolymerization of two of the above polymers or terpolymerization of the above polymers or their components, For example, an adipic, isophthalic acid, hexamethylene diamine copolymer. Preferably, the polyamides are linear with a melting point in excess of 200° C. As great as about 99 percent by weight of the composition can be composed of polyamide. However, preferred compositions contain from about 40 to about 95 percent, and more narrowly about 65 to about 85 percent, by weight of the polyamide.

Elastic copolymers of ethylene, at least one $C_3$ to $C_6$ α-monoolefin, and such copolymers with at least one nonconjugated diene are well known in the art. They are referred to herein as "EP or EPDM-type" copolymers. These copolymers have a substantially saturated hydrocarbon backbone chain that causes the copolymer to be relatively inert to ozone attack and oxidative degradation and may have side-chain unsaturation available for curing.

These copolymers are conveniently prepared by copolymerizing the monomers in the presence of a coordination catalyst system, such as diisobutylaluminum chloride and vanadium oxychloride. Copolymerization can be conducted in an inert solvent or in a slurry or particle form reactor. Details of their preparation are given, for example, in U.S. Pat. Nos. 2,962,451; 2,993,480; 3,000,866; 3,063,973; 3,093,620; 3,093,621; 3,147,230; 3,154,528; 3,260,708; and Sittig, *Stereo Rubber and Other Elastomer Processes,* Noyes Development Corporation, Park Ride, N.J. (1967).

Propylene is normally selected as the α-monoolefin in preparing such copolymers because of its availability and for reasons of economics. Other lower α-monoolefins, such as 1-butene, 1-pentene, and 1-hexene can be selected in place of or in addition to propylene in preparing elastomeric copolymers that are useful in the practice of the present invention. The term "EPDM," as used herein, refers to the preferred copolymers of ethylene, propylene, and at least one nonconjugated diene.

The monoreactive nonconjugated dienes that can be used to prepare the EPDM-type copolymers include linear aliphatic dienes of at least six carbon atoms that have one terminal double bond and one internal double bond, and cyclic dienes wherein one or both of the carbon-to-carbon double bonds are part of a carbocyclic ring. Where linear dienes are employed, copolymers of ethylene, propylene, and 1,4-hexadiene having an inherent viscosity of at least about 1.5 are especially preferred.

Cyclic dienes that can be used to prepare the EPDM-type copolymers include alkylidene bicycloalkenes, alkenyl bicycloalkenes, bicycloalkadienes, and alkenyl cycloalkenes. Representative of alkylidene bicycloalkenes are 5-ethylidene-2-norbornene and 5-methylene-2-norbornene. Representative of alkenyl bicycloalkenes are 5-alkylene-2-norbornenes, such as 5-(1'-propenyl)-2-norbornene, 5-(2'-butenyl)-2-norbornene, and 5-hexenyl-2-norbornene. Dicyclopentadiene and 5-ethyl-2,5-norbornadiene are illustrative of bicycloalkadienes, and vinyl cyclohexene is representative of alkenyl cycloalkenes that can be selected as the diene monomer. EPDM-type copolymers prepared from cyclic dienes preferably have an inherent viscosity within the range of about 1.5 to 3.0, as measured on 0.1 gram of copolymer dissolved in 100 mL of perchloroethylene at 30° C., for optimum processing properties. Of the cyclic dienes, 5-ethylidene-2-norbornene is preferred.

Another class of preferred copolymers includes branched tetrapolymers made from ethylene, at least one $C_3$ to $C_6$ α-monoolefin, with propylene being preferred, at least one monoreactive nonconjugated diene, and at least one direactive nonconjugated diene, such as 2,5-norbornadiene or 1,7-octadiene. By "direactive" is meant that both double bonds are capable of polymerizing during preparation of the copolymer. Tetrapolymers of this class preferably have an inherent viscosity of about 1.2 to 3.0, as measured on 0.1 gram of the copolymer dissolved in 100 mL of perchloroethylene at 30° C., for optimum processing properties. A preferred copolymer of this class is a tetrapolymer of ethylene, propylene, 1,4-hexadiene, and 2,5-norbornadiene. Such copolymers are described in Canadian Patent Numbers 855,774 and 897,895.

The maleated EPDM materials employed in the practice of this invention can be prepared by any of the known methods described in the prior art. See, for example, U.S. Pat. No. Reissue 31,680 and Gaylord, N., *Chem. Tech.*, Jul. 1989, pp. 435–40.

Although the following discussion is directed to the addition of maleic anhydride to form a graft, those skilled in the art will understand that maleic acid or fumaric acid can, if desired, be directly substituted for the maleic anhydride to form the same adduct. Also, the use of other addition reactions with this hydrocarbon side-chain unsaturation can be used to prepare these components of the present invention.

It is generally desired to form adducts containing about 0.02 to 10 percent, preferably about 0.1 to 5 percent, and more preferably about 0.3 to 2.0 percent, by weight maleic anhydride. Adducts having such quantities of maleic anhydride have sufficient carboxylated sites for the addition reaction with the polyamides.

Polyethylenes employed in the practice of the present invention include those known in the art as high-density polyethylenes (HDPE), linear low-density polyethylenes (LLDPE), and very low-density polyethylenes (VLDPE). Very low-density polyethylenes are also known in the art as "plastomers." These three classes of polyethylenes are characterized by the ranges of their polymer densities. High-density polyethylenes have a polymer density greater than about 0.935 g/cc; linear low-density polyethylenes have a polymer density in the range of from about 0.915 to about 0.935 g/cc; and very low density polyethylenes have a polymer density in the range of from about 0.870 to about 0.915 g/cc.

For use in the practice of this invention, the resinous olefin homopolymer or copolymer, e.g., polyethylene, can, if desired, be maleated with maleic anhydride, maleic acid, fumaric acid, and the like by processes known in the art substantially similar to those described above for EPDM-type copolymers. Where such homopolymers or copolymers are maleated, the elastomeric olefin copolymer, e.g., EPDM-type copolymers, employed in the practice of the invention can be either maleated or non-maleated, although maleated is preferred. It is required, however, that at least one of the two polymers be maleated.

The modified polyamide resin can be prepared by melt-blending up to about 99 percent by weight, preferably from about 40 to about 95 percent by weight, or more preferably from about 65 to about 85 percent by weight of the polyamide with a sufficient amount of the impact modifier blend of the present invention to yield 100 percent by weight. For example, 75 percent of the polyamide can be blended with 25 percent by weight of the modifier blend. In the modifier blend, the ratio of the resinous olefin homopolymer or copolymer (preferably polyethylene) to elastomeric olefin copolymer (preferably EPDM-type copolymer) is preferably in the range of from about 95/5 to about 5/95, more preferably from about 80/20 to about 20/80, by weight.

The compositions of the present invention can be modified by one or more conventional additives such as stabilizers and inhibitors of oxidative, thermal, and ultraviolet light degradation; lubricants and mold release agents; colorants including dyes and pigments; fibrous and particulate fillers and reinforcements; nucleating agents; plasticizers; and the like.

Where stabilizers are to be employed, they can be incorporated into the thermoplastic composition at any stage in its preparation. Preferably, the stabilizers are included early to preclude the initiation of degradation before the composition can be protected. Such stabilizers must be compatible with the composition.

Oxidative and thermal stabilizers useful in the materials of the present invention include those used in addition to polymers generally. They include, for s example, up to 1 percent by weight, based on the weight of the polyamide, Group I metal halides, for example, sodium, potassium, and lithium, with cuprous halides, for example, chloride, bromide, iodide, hindered phenols, hydroquinones, and varieties of substituted members of those groups and combinations thereof.

Ultraviolet light stabilizers, typically in a concentration of up to about 2.0 percent based on the weight of the polyamide, can also be those used in addition to polymers generally. Examples of ultraviolet light stabilizers include various substituted resorcinols, salicylates, benzotriazoles, benzophenones, and the like.

Other additives that can be incorporated into the compositions of the present invention include:

suitable lubricants and mold release agents such as stearic acid, stearic alcohol, and stearamides, in a concentration up to 1.0 percent based on the weight of the composition;

organic dyes such as nigrosine, etc.;

pigments such as titanium dioxide, cadmium sulfide, cadmium sulfide selenide, phthalocyanines, ultramarine blue, carbon black, etc.;

fibrous and particulate fillers and reinforcements such as carbon fibers, glass fibers, amorphous silica, asbestos, calcium silicate, aluminum silicate, magnesium carbonate, kaolin, chalk, powdered quartz, mica, feldspar, etc., in a concentration up to 50 percent based on the weight of the composition;

nucleating agents such as talc, calcium fluoride, sodium phenyl phosphinate, alumina, and finely divided polytetrafluoroethylene, etc.; and plasticizers such as dioctyl phthalate, dibenzyl phthalate, butyl benzyl phthalate, hydrocarbon oils, N-normal butyl benzene sulfonamide, ortho and para toluene ethyl sulfonamide, etc., in a concentration up to about 20 percent based on the weight of the composition. The colorants (dyes and pigments) can be present in an amount of up to about 5.0 percent by weight, based on the weight of the composition.

The toughened compositions of the present invention can be prepared by melt blending, in a closed system, the polyamide, the EPDM-type copolymer, and the polyethylene into a uniform mixture in a multi-screw extruder, such as a Werner Pfleiderer extruder having, generally, two to five kneading blocks and at least one reverse pitch to generate high shear, or other conventional plasticating devices, such as a single-screw extruder, Brabender, Banbury mill, or the like. Alternatively, the blends may be made by coprecipitation from solution, blending or dry mixing the components, and then melt fabricating the dry mixture by extrusion.

The toughened thermoplastic compositions can be made into a wide range of useful articles by conventional molding methods employed in the fabrication of thermoplastic articles, for example, as molded parts and extruded shapes such as tubing, films, sheets, fibers and oriented fibers, laminates, and wire coatings. "Molding" means forming an article by deforming the blend in the heated plastic state.

The compositions of the present invention are characterized by an outstanding combination of properties, foremost of which is toughness. The high toughness provides improved ductility, less sensitivity to scratches and molded-in notches, and reduced susceptibility to catastrophic failure. Injection-molded parts often are of varying thicknesses and may have scratches, molded-in notches of varying radii, and molded-in stresses. In addition, orientation effects may cause varied ductility throughout a molded part. The maintenance of high uniform values of notched Izod toughness throughout such molded parts characterizes the improved compositions' resistance to brittle breaks. The compositions are of sufficient toughness that the effect of minor changes in processing conditions will not cause significant variations in toughness from lot to lot quantities of composition.

The blended polymer compositions of the present invention are recyclable. For example, scrap material produced from processing of the blended polymer compositions of the present invention, such as scrap material from thermoforming processes, can be recovered, reground, and blended with uncured polymers of the same or different composition. This blend can thereafter be used in the same manner as virgin material. The amount of scrap material included in the blended polymer compositions of the invention may vary from about 1 to about 99 percent by weight, more preferably from about 10 to about 60 percent by weight, based on the total weight of the blended polymer of the invention and the scrap.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Three different polyethylenes were used in the preparation of compositions within the scope of the present invention. Their characteristics are shown in Table 1. Densities were determined as described above.

TABLE 1

Polyethylene Characteristics

| Designation | Type | MFR | Density |
|---|---|---|---|
| PE-1 | LLDPE | 110 | 0.93 |
| PE-2 | VLDPE | 35 | 0.88 |
| PE-3 | HDPE | 20 | 0.95 |

The method used for determining the Melt Flow Rate (MFR) of products herein is based upon ASTM standard D-1238 Procedure A (incorporated herein by reference). The data in Table 1 are reported in g/10 minutes measured at 190° C./2.16 kg load.

Two different maleated EPDM polymers were used in the preparation of compositions within the scope of the present invention. The diene in MA-EPDM-1 was 5-ethylidene-2-norbornene; in MA-EPDM-2, the diene was dicyclopentadiene. Their characteristics are shown in Table 2. In both cases, the MFR in g/10 minutes measured at 190° C./2.16 kg load was less than 0.1.

TABLE 2

Characteristics of MA-EPDM's

| Designation | % MA Grafted | E/P Ratio | Mooney Viscosity ML(1 + 4) @ 257° F. | Iodine # |
|---|---|---|---|---|
| MA-EPDM-1 | 1.0 | 57/43 | 60 | 17 |
| MA-EPDM-2 | 0.6 | 68/32 | 40 | 6 |

The percent MA grafted can be determined using a Perkin Elmer FTIR 1600 Spectrometer and calibrated standards of MA-EPDM.

The procedure used for determining the Mooney viscosities for the maleated EPDM is the ASTM D-1646 test method for rubber viscosity and prevulcanization characteristics of elastomers by Mooney Viscometer, incorporated herein by reference in its entirety.

Notched Izod impact measurements were carried out by the standard ASTM D-256 procedure, Method A, incorporated herein by reference. This is a cantilever beam test employing a pendulum-type hammer. This method is applicable to brittle materials wherein the energy of fracture propagation is small compared to the fracture initiation.

Nylon/modifier compositions were made in a Werner Pfleiderer ZSK-30 mm twin screw extruder at 250° C., 250 rpm or in a Killian single-screw extruder at 60 rpm. Preblended ingredients were added to the extruder hopper with nylon that had been dried for three hours at 110° C. prior to blending. The extrudate was stranded, cooled under water, cut to 5 mm pellets, dried for three hours at 110° C., and molded to form 2"×½×⅛" specimens, having a ⅛" deep notch. Impact measurements were made on test specimens dry as molded.

Seven samples of the modifiers of the present invention and of nylon compositions containing them were prepared. See Table 3. Samples A through E are blends of EPDM (E/P ratio 57/43) and VLDPE wherein both the EPDM and the VLDPE are maleated. In sample F only the polyethylene is modified with maleic anhydride, and in sample G only the EPDM is so modified.

It is seen that the melt flow index of the modifier combination increases as the level of polyethylene increases. Table 3 also shows the effects of these modifiers on the Notched Izod impact strength of Nylon 6/6 when added thereto at the 25 percent by weight level.

TABLE 3

Impact Data for Improved Flow Modifiers

| | | Components | | Notched Izod ft.lb./in.** | | |
|---|---|---|---|---|---|---|
| Sample | MFI* | Maleated MA-EPDM-1/PE-2 gMA | Nonmaleated None | R.T. | −30° C. | −40° C. |
| A | 37 | 80/20 | — | 20.3 | 6.9 | 6.1 |
| B | 73 | 65/35 | — | 18.9 | 6.4 | 5.5 |
| C | 145 | 50/50 | — | 18.4 | 5.8 | 5.0 |
| D | 286 | 35/65 | — | 5.7 | 4.1 | 3.1 |
| E | 510 | 20/80 | — | 14.6 | 4.6 | 3.3 |
| F | 103 | PE-2 gMA (50) | EPDM-1 (50) | 15.3 | 5.6 | 4.2 |
| G | 178 | MA-EPDM-1 (50) | PE-2 (50) | 18.9 | 6.3 | 5.4 |

*MFI, gms per 10 min. @ 230° C./21.6 kg wt. "MFI" stands for "Melt Flow Index" and, as used herein, is considered synonymous with MFR.
**Notched Izod impact data are for 25 percent modifier in PA 6/6.
"gMA" in the above table stands for "grafted maleic anhydride."

Tables 4 and 5 show that the melt flow indices of two different maleated EPDM polymers increase with increasing levels of nonmaleated polyethylene (VLDPE and LLDPE). Notched Izod impact results are also given for nylon 6/6 blends containing the modifiers of the present invention and a modifier consisting only of maleated EPDM.

TABLE 4

MA-EPDM-1 Polyethylene Blends
Flow Behavior/Impact Toughening*

| Modifier Composition | | | M.F.I. | Notched Izod Impact | | |
|---|---|---|---|---|---|---|
| Maleated Phase | Nonmaleated Phase | Weight Ratio | (a) gm/10 min | ft. lb./inch | | |
| | | | | R.T. | −30° C. | −40° C. |
| MA-EPDM-1 | PE-1 | 50/50 | 225 | 22.4 | 6.7 | 4.8 |
| | | 35/65 | 463 | 18.3 | 4.4 | 1.5 |
| | | 20/80 | 778 | 4.4 | 3.3 | 0.8 |

TABLE 4-continued

MA-EPDM-1 Polyethylene Blends
Flow Behavior/Impact Toughening*

| Modifier Composition | | | M.F.I. | Notched Izod Impact | | |
|---|---|---|---|---|---|---|
| Maleated Phase | Nonmaleated Phase | Weight Ratio | (a) gm/10 min | ft. lb./inch | | |
| | | | | R.T. | −30° C. | −40° C. |
| MA-EPDM-1 | PE-2 | 50/50 | 178 | 18.9 | 6.3 | 5.4 |
| | | 35/65 | 298 | 15.9 | 4.4 | 1.8 |
| | | 20/80 | 572 | 3.6 | 3.4 | 1.3 |
| MA-EPDM-1 | None | 100% | 5-25 | 22.7 | 26 | 16.3 |

*Notched Izod data for 25 percent modifier in PA 6/6
(a) MFI of MA-EPDM-1 or MA-EPDM-2 is in the range of 5 to 25 g/10 min., at 230° C./21.6 kg; under these conditions, MFI of PE-1 is > 850, PE-2 is 685, and PE-3 in Table 6 is 500.

TABLE 5

MA-EPDM-2 Polyethylene Blends
Flow Behavior/Impact Toughening*

| Modifier Composition | | | M.F.I. | Notched Izod Impact | | |
|---|---|---|---|---|---|---|
| Maleated Phase | Nonmaleated Phase | Weight Ratio | (a) gm/10 min | ft. lb./inch | | |
| | | | | R.T. | −30° C. | −40° C. |
| MA-EPDM-2 | PE-1 | 50/50 | 254 | 18.0 | 4.6 | 1.7 |
| | | 35/65 | 426 | 5.4 | 3.7 | 1.2 |
| | | 20/80 | 763 | 1.7 | 2.9 | 0.5 |
| MA-EPDM-2 | PE-2 | 50/50 | 180 | 14.6 | 4.4 | 2.6 |
| | | 35/65 | 382 | 5.6 | 3.2 | 1.1 |
| | | 20/80 | 593 | 3.9 | 3.5 | 1.4 |
| MA-EPDM-2 | None | 100% | 8-15 | 17.4 | 5.8 | 5.1 |

*Notched Izod data for 25 percent modifier in PA 6/6
(a) MFI of MA-EPDM-1 or MA-EPDM-2 is in the range of 5 to 25 g/10 min., at 230° C./21.6 kg; under these conditions, MFI of PE-1 is > 850, PE-2 is 685, and PE-3 in Table 6 is 500.

Table 6 shows results obtained for melt flow index of the modifier and notched Izod impact value of nylon when a maleated EPDM (55/45 E/P ratio) is blended with two different polyethylenes (LLDPE and HDPE) and then incorporated into nylon 6 and nylon 6/6.

TABLE 6

MA-EPDM-1/Polyolefin Blends:
Toughening of PA (6/6) and PA (6)

| Modifier Characteristics | | | | Nylon Blend Notched Izod Impact* | | | | |
|---|---|---|---|---|---|---|---|---|
| Modifier Composition | | | | | PA (6/6) | | PA (6) | |
| Maleated Phase | PE Phase | Weight Ratio | MFI** | Wt % Modifier | R.T. | −40° C. | R.T. | −40° C. |
| MA-EPDM-1 | PE-1 | 50/50 | 12 | 0 | 1.5 | 1.7 | 1.0 | 0.7 |
| | | | | 20 | 16.5 | 2.6 | 11.4 | 2.9 |
| | | | | 25 | 20.8 | 2.8 | 11.6 | 4.5 |
| MA-EPDM-1 | PE-3 | 50/50 | 5 | 0 | 1.5 | 1.7 | 1.0 | 0.7 |
| | | | | 20 | 15.1 | 2.8 | 16.6 | 2.0 |
| | | | | 25 | 21.2 | 3.1 | 18.1 | 3.3 |

*In units of ft. lbs./inch.
**(100 percent MA-EPDM-1 had <0.1 MFI.)

TABLE 7

MA-EPDM-1/Polyolefin Blends used in
Impact Toughening of PA(6)
Using a Single-Screw Extruder[a]

| Modifier Characteristics | | | | Notched Izod Impact* in PA(6)** | |
|---|---|---|---|---|---|
| Composition | | | | | |
| Maleated Phase | Non-Mal Phase | Weight Ratio | M.F.I. g/10 min. | Room Temp. | −40° C. |
| MA-EPDM-1 | PE-3 | 50/50 | 5 | 14.4 | 4.9 |
| MA-EPDM-1 | PE-1 | 50/50 | 12 | 15.4 | 5.2 |

*Impact values are in ft. lbs/inch.
**PA(6) blends contain 20% modifier and 80% PA(6).
[a]This is an example of low shear compounding equipment.

In view of the many changes and modifications that can be made without departing from principles underlying the invention, reference should be made to the appended claims for an understanding of the scope of the protection afforded the invention.

What is claimed is:

1. An impact modifier for thermoplastic polyamides consisting essentially of:

(A) a maleated EP or EPDM copolymer; and (B) a maleated very low density polyethylene;

the melt flow index of pure (A) is less than 0.1 g per 10 minutes at 230° C. and 2.16 kg weight and the melt flow index of pure (B) is at least 20 g per 10 minutes at 230° C. and 2.16 kg weight;

wherein the melt flow index of the resulting composition is in the range of from about 5 to about 100 g per 10 minutes at 230° C. and 2.16 kg weight under conditions wherein the melt flow index of pure (A) is less than 0.1 g per 10 minutes at 230° C. and 2.16 kg weight and the melt flow index of pure (B) is at least 20 g per 10 minutes at 230° C. and 2.16 kg weight.

2. The modifier of claim 1 wherein the ratio of (A) to (B) is in the range of from about 95/5 to about 5/95 by weight.

* * * * *